United States Patent [19]
Wessinger

[11] Patent Number: 5,560,314
[45] Date of Patent: Oct. 1, 1996

[54] BIRDHOUSE ASSEMBLY

[76] Inventor: Paul E. Wessinger, 168 Old Kimbrell Rd., Chesnee, S.C. 29323

[21] Appl. No.: 502,909

[22] Filed: Jul. 17, 1995

[51] Int. Cl.$^6$ .................................................. A01K 31/00
[52] U.S. Cl. ........................................... 119/433; 119/428
[58] Field of Search ................................... 119/428, 430, 119/432, 433, 52.2, 52.3, 57.8, 57.9

[56] References Cited

U.S. PATENT DOCUMENTS

| | | |
|---|---|---|
| 66,520 | 7/1867 | Redding . |
| 198,049 | 12/1877 | Schater . |
| 2,887,987 | 5/1959 | Fitzgerald et al. ............ 119/433 |
| 3,182,635 | 5/1965 | Waite ................... 119/428 X |
| 3,367,632 | 2/1968 | Vail ......................... 119/428 |
| 3,696,792 | 10/1972 | Bruhns ..................... 119/428 |
| 3,783,831 | 1/1974 | Patliff . |
| 3,792,685 | 2/1974 | Wiener ..................... 119/433 |
| 3,814,059 | 6/1974 | Eickhof .................... 119/432 |
| 4,033,296 | 7/1977 | Cudmore ................... 119/428 |
| 4,702,198 | 10/1987 | Holyoak .................... 119/433 |
| 4,765,277 | 8/1988 | Bailey et al. ............. 119/428 X |
| 5,195,460 | 3/1993 | Loken .................... 119/52.3 X |
| 5,215,040 | 6/1993 | Lemley ................... 119/52.3 X |

OTHER PUBLICATIONS

U. S. Department of Agriculture Farmer's Bulletin, No. 609, pp. 4–5.

*Primary Examiner*—Robert P. Swiatek
*Assistant Examiner*—Elizabeth Shaw

[57] ABSTRACT

The purple martin birdhouse assembly of the present invention includes a plurality of gourds suspended from an array of tubular members. The array is connected by tubular radial arms, from which gourds may also, optionally, be suspended to a central sleeve which is slidably mounted on a pole. The entire array attached to the sleeve may be raised and lowered by a winch and associated pulleys. Undesired rotation of the sleeve, according to a preferred embodiment, is prevented by means of solid, tubular members mounted on the pole which allow for upward movement of the central sleeve but which project downwardly into position adjacent to the radial arms to prevent both clockwise and counterclockwise rotation.

6 Claims, 4 Drawing Sheets

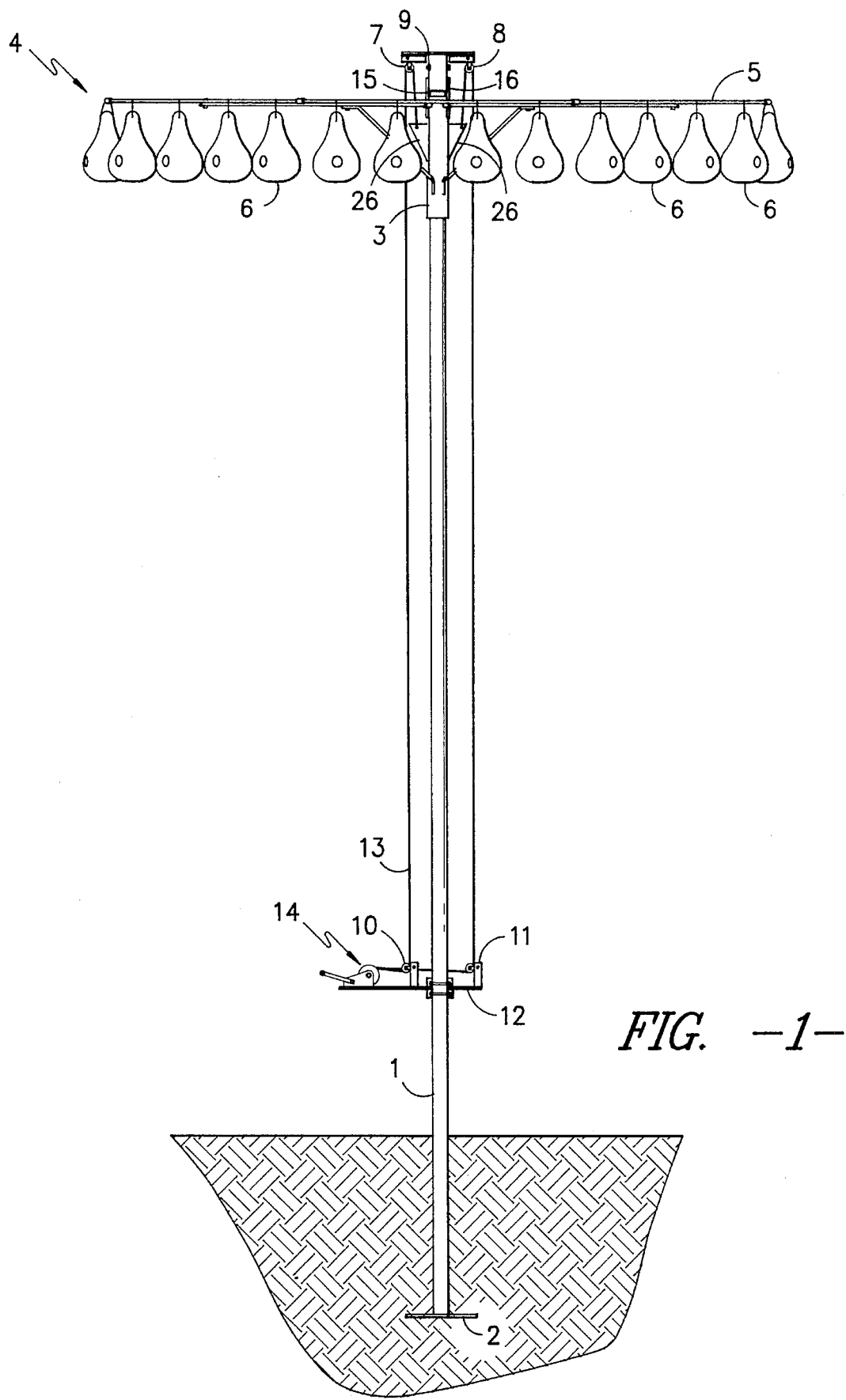
FIG. -1-

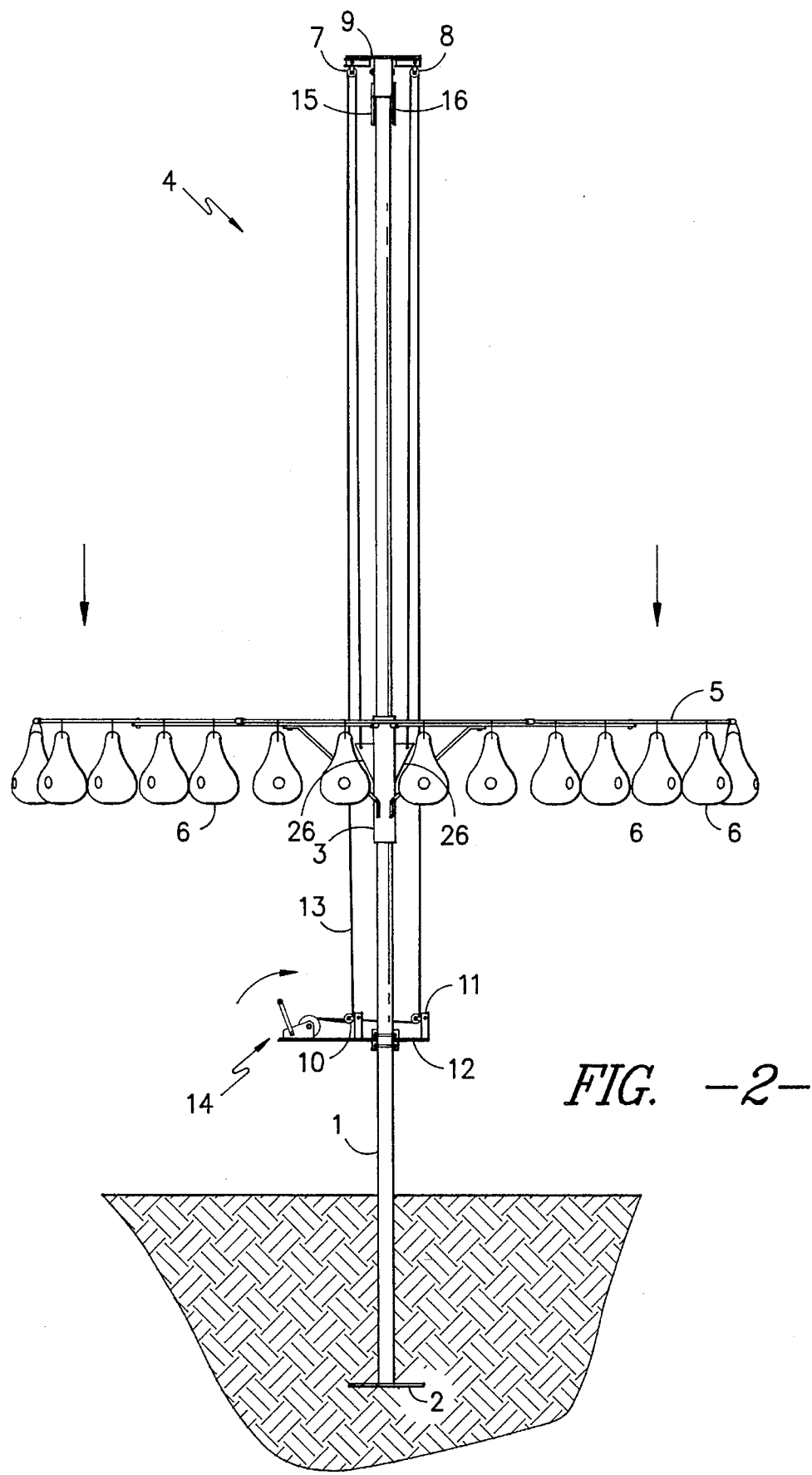
FIG. -2-

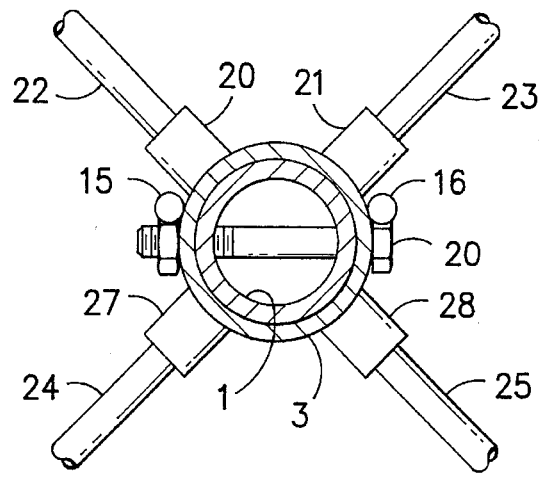
FIG. -3-
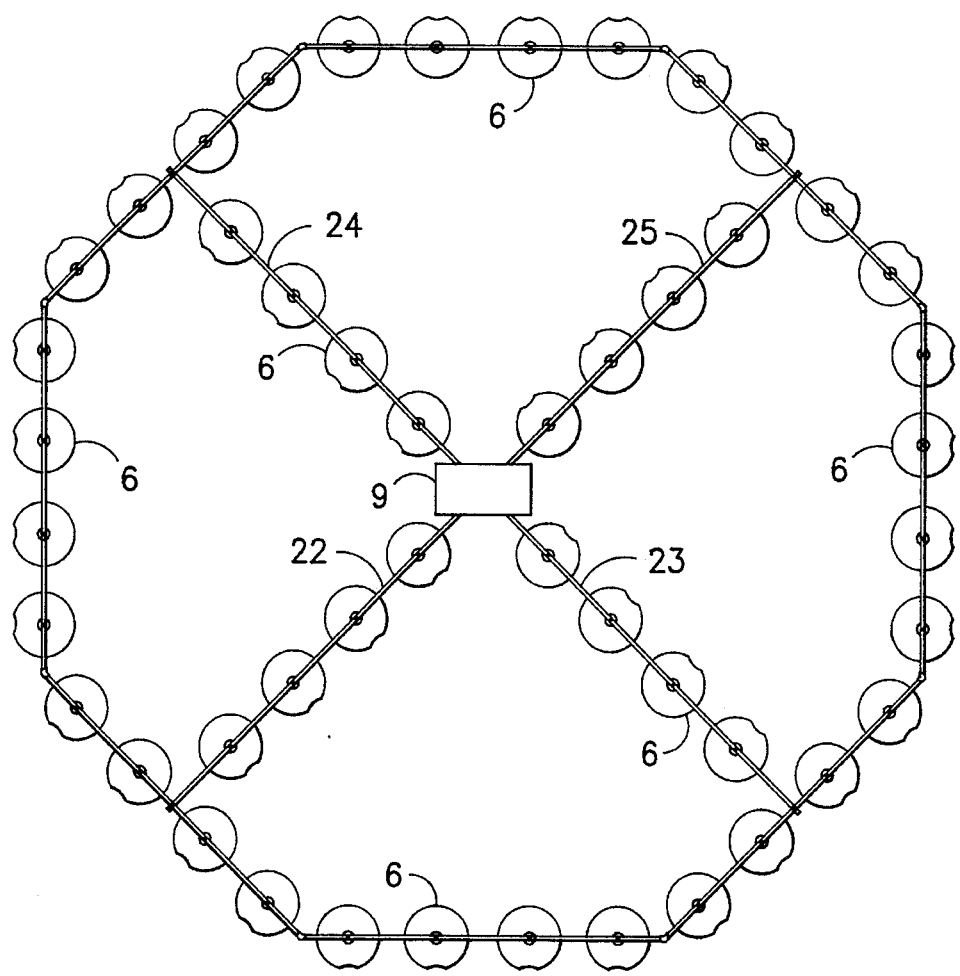
FIG. -4-

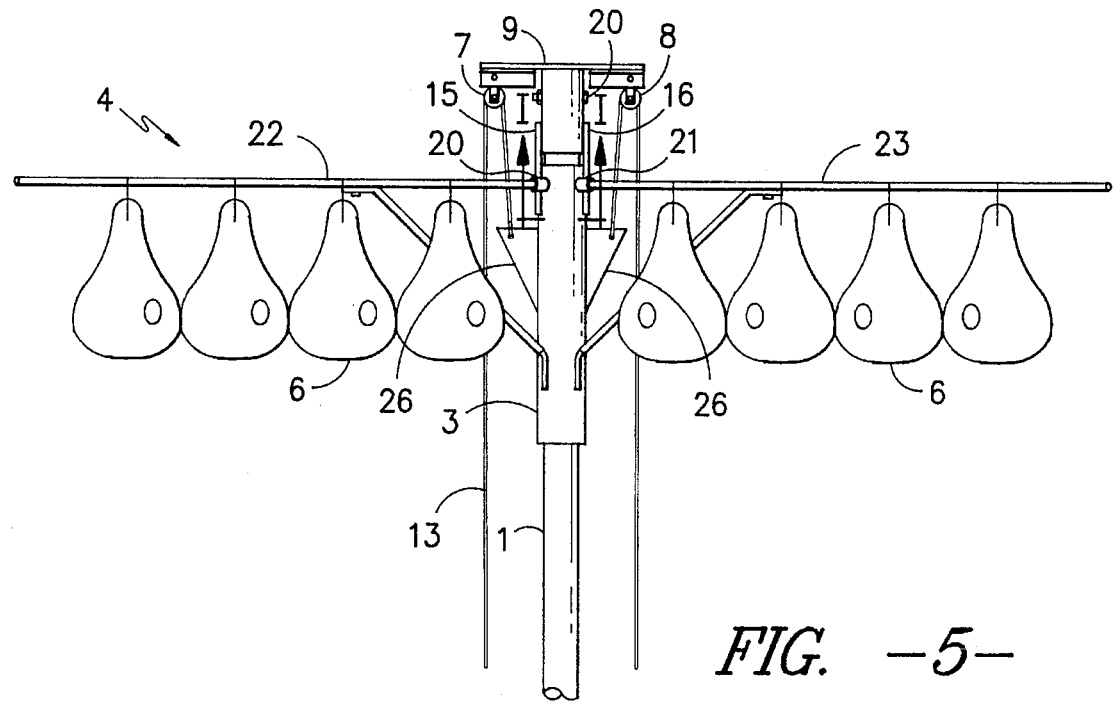
FIG. -5-
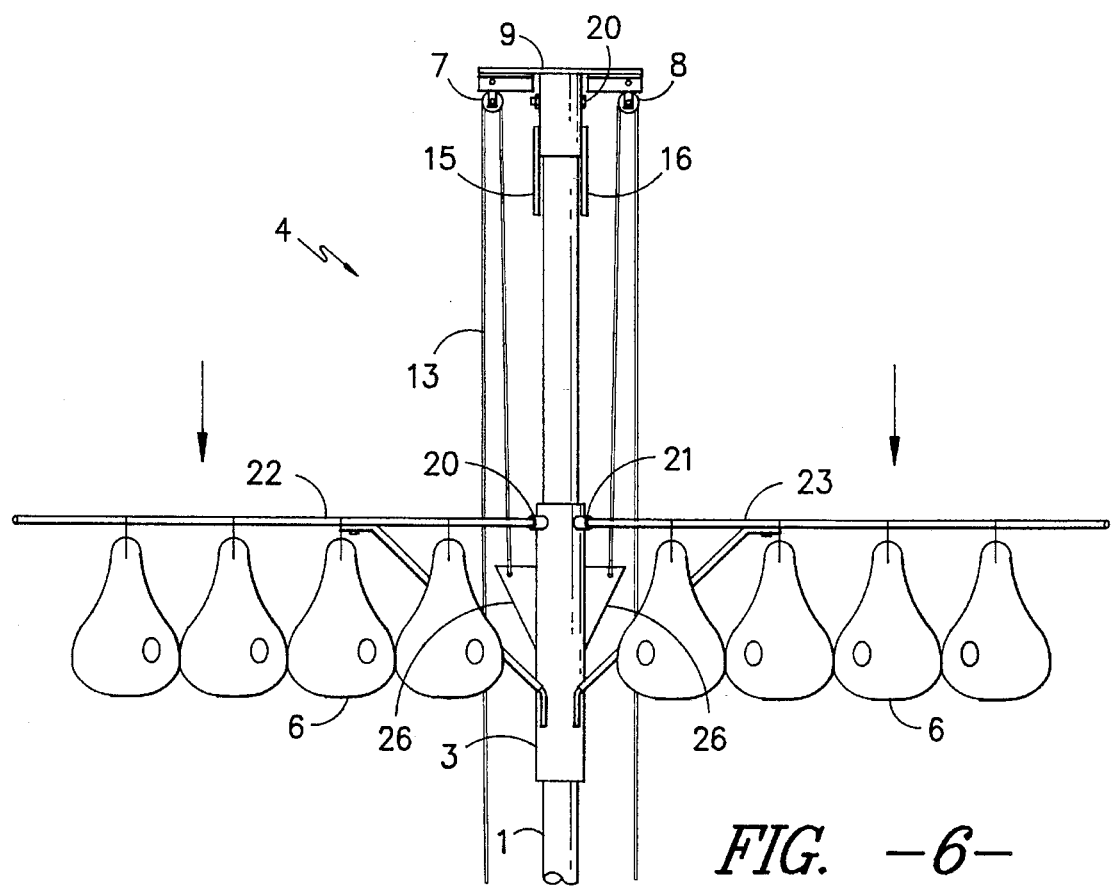
FIG. -6-

BIRDHOUSE ASSEMBLY

FIELD OF THE INVENTION

This invention relates generally to birdhouses of various kinds and relates specifically to birdhouses for purple martins having means to facilitate the cleaning of the birdhouse.

BACKGROUND OF THE INVENTION

Purple martins have proven to be very beneficial to the health and comfort of humans because their main diet consists of mosquitos and other insects that bite people and cause itching. Such insects also may carry diseases such as malaria and yellow fever. A single purple martin can devour as many as 2,000 mosquitos and other insects each day and therefore they are much desired in areas where mosquitoes are prevalent. Purple martins, however, are very selective about their living quaffers since they have a social instinct and like to dwell near others of their same species. This instinct is conspiciously lacking in most other birds. Also, purple martins will not nest in dwellings which are not scrupulously clean, nor will they nest in dwellings which other birds such as sparrows or starlings have occupied.

Many efforts have been made to provide birdhouses for various types of birds including purple martins in which some means has been provided for cleaning the houses after the young have been reared and left the nest. Some of these devices have been mounted on relatively tall posts to reduce the possibility of predators attacking the birds.

A variety of gourd-shaped nesting arrays have been suggested in the prior art, including arrays which may be lowered from a normally raised position for cleaning, observation and the like. Thus, Patliff, U.S. Pat. No. 3,783,831 (incorporated by reference) discloses the use of gourds for purple martin nesting arrays and teaches the use of gourd-like shapes for purple martin nesting. As disclosed at Column 3, lines 60 et. seq. "one or more houses can be mounted on a particular post equipped with appropriate cross members." Similarly, Wiener, U.S. Pat. No. 3,792,685 (incorporated by reference) discloses a purple martin birdhouse which is slidably mounted on a post to facilitate raising and lowering of the birdhouse for cleaning and/or observation.

The birdhouse assemblies of the present invention present radial arms supported on a central sleeve which is slidably mounted on a pole and raised and lowered by a winch and pulley. According to a preferred embodiment, uncontrolled rotation of the central sleeve about the pole during windy conditions may be controlled. Such uncontrolled rotation may not be disadvantageous in assemblies used for other purposes such as clothes drying as disclosed by Redding, U.S. Pat. No. 66,520 and Schater, U.S. Pat. No. 198,049. Nonetheless, such rotation is undesired in a birdhouse assembly and may even make the assembly uninhabitable.

Accordingly, the present invention provides a birdhouse assembly that is particularly adapted for housing purple martins. The assembly permits the housing of these birds by means of an array that is particularly attractive to the birds, which prevents or discourages predators of the birds and which may be cleaned or observed easily. Such assembly is, furthermore, according to a preferred embodiment quite stable in an outdoor environment and is not susceptible to undesired rotation around its mounting pole when the wind blows which could discourage purple martin nesting.

SUMMARY OF THE INVENTION

The purple martin birdhouse assembly of the present invention includes a plurality of gourds suspended from an array of tubular members. The array is connected by tubular radial arms, from which gourds may also, optionally, be suspended to a central sleeve which is slidably mounted on a pole. The entire array attached to the sleeve may be raised and lowered by a winch and associated pulleys. Undesired rotation of the sleeve, according to a preferred embodiment, is prevented by means of solid, tubular members mounted on the pole which allow for upward movement of the central sleeve but which project downwardly into position adjacent to said radial arms to prevent both clockwise and counter-clockwise rotation.

DETAILED DESCRIPTION OF THE INVENTION

As mentioned above, one of the major considerations in designing a purple martin birdhouse array is that the nesting compartments should be easily cleanable. This has been a particularly difficult problem for purple martin birdhouses because the martins prefer nests which are located high above the ground. One of the major advantages of the present invention is that the array may be easily raised and lowered for frequent cleaning. In order to provide a convenient means for raising and lowering the housing array an elongated hollow pole is provided. The pole may be imbedded in concrete and placed either above or below ground.

Slidably mounted on the pole is a tubular central sleeve. The central sleeve may be constructed of any suitable material such as aluminum or polyvinyl chloride so long as the diameter of the inside of the sleeve is greater than the external diameter of the pole such that the tubular sleeve will easily slide up and down the pole.

The assembly is further provided with a tubular array extending generally around the circumference of the assembly. The array may be of any desired shape such as circular or preferably octagonal so long as it is suitable for suspending the housing gourds therefrom. The tubular array may be constructed of any suitable, available materials such as metal or plastic piping, etc.

The tubular array is attached to the tubular sleeve by means of a plurality of radial arms (preferably four to six) connected to and extending from the central sleeve to the tubular array. The radial arms should be of a material and construction appropriate to suspend the tubular array in the desired position in an outdoor environment.

The assembly is further provided with a rope and pulley arrangement for raising and lowering the housing array. There may be singular or dual rope and pulley arrangements. The rope is attached to the tubular sleeve and then extends to the top section of the post where it extends through a pulley. From the pulley the rope extends downwardly to a location near the bottom of the post which is conveniently accessible to an operator. At that location is provided a winch arrangement around which the rope is wound and by means of which the housing array may be raised or lowered as desired.

The gourds employed for housing and nesting according to the invention may be either a natural gourd or a hollow housing, preferably having a gourd like shape, made of synthetic resin material such as acrylonitrile-butadiene-styrene (ABS) resin, polyethylene, or the like. Individual housings are each provided with an opening of suitable size for ingress and egress of the birds. The lower portion of the housing may optionally be provided with a drain hole. The upper portion of the housing is provided with a hanging means such as a hook or loop for either directly attaching the housing to the tubular members or for attaching the housing by means of string or wire of suitable construction. Suitable housings which may be employed are disclosed, for instance, in Patliff, U.S. Pat. No. 3,783,831, incorporated by reference.

BRIEF DESCRIPTION OF THE DRAWINGS

FIG. 1 is a side elevation illustrating the birdhouse array suspended on the pole ready for occupancy.

FIG. 2 is a side elevation illustrating the birdhouse array which has been lowered for observation or cleaning.

FIG. 3 is cross sectional view taken along line I—I in FIG. 5.

FIG. 4 is a top plan view showing the position of the radial arms.

FIG. 5 is a side view of a preferred embodiment showing the positioning of the solid, tubular pins relative to the radial arms to prevent rotation of the array.

FIG. 6 is a side view showing the array as it is moving from the raised position to the lowered position.

DETAILED DESCRIPTION OF THE DRAWINGS

Referring now to FIG. 1, the pole 1 may be anchored in the ground by means of a cement anchor or it may simply be buried at a sufficient depth to stabilize the pole. As shown the pole is provided with a metal base 2 welded to the pole 1 for further stability. On pole 1 is provided a central sleeve 3 slidable on pole 1 onto which the housing array 4 is attached. The housing array 4 is provided with a tubular array 5 extending around the periphery of the housing array. The housing array is attached to the metal sleeve 3 by means of radial arms not shown. Gourds 6 are suspended from the housing array to provide family housing units for the purple martins.

The housing array 4 is shown in the raised position but may be lowered for observation and cleaning periodically by means of a pulley arrangement which consists of stationary pulleys 7 and 8 which are anchored to cap 9 bolted to the pole 1. Located at a convenient height above the ground are swivel pulleys 10 and 11 which are attached to pole 1 by winch base 12. Rope 13 is attached to flange 26 protruding from sleeve 3 and it passes through pulleys 7, 10, is wrapped onto winch 14 and then passes through pulleys 11 and 8. The other end of rope 13 is attached to flange 26 on the opposite side thereof such that central sleeve 3 will move up and down post 1 as winch 14 is wound and unwound without sleeve 3 becoming jammed onto post 1. Solid iron pins 15 and 16 are welded to cap 9 on the opposite sides thereof and extend downwardly from cap 9 as shown an appropriate distance so that when housing array 4 is raised to the desired position pins 15 and 16 extend downwardly on opposite sides of the radial arms to prevent undesired rotation of housing array 4.

Referring now to FIG. 2, housing array 4 is shown in the "down" position achieved by turning winch counter-clockwise. In this position gourds 6 which comprise the family housing units may be inspected, cleaned, etc. The housing array 4 may be raised to the upper position simply by turning winch 14 in a clockwise direction.

Referring to FIG. 3, the anti-rotation mechanism is illustrated by means of a cross-sectional view taken of cap 9. Tubular portion of cap 9 extends around the periphery of pole 1 and is anchored to pole 1 by a bolt. Welded to cap 9 are two metal pins 15 and 16 which are positioned such that when housing array 4 is in the upward position pins 15 and 16 abut nipples 20, 21, 27 and 28 provided as attaching means for radial arms 22, 23, 24 and 25.

In FIG. 4 a top view of the housing array 4 is provided to illustrate how radial arms 22, 23, 24 and 25 attach to metal sleeve 3 (not shown) and also attach to octagonal tubular array 5. As shown radial arms 22, 23, 24 and 25 are also provided with suspended gourds 6, and such embodiment may be preferred.

FIG. 5 is a frontal view showing the housing array 4 in a raised position with pins 15 and 16 extending downwardly past nipples 20 and 21 and so positional as to prevent undesired rotation of the housing array in windy conditions. FIG. 6 shows housing array 4 as it is in the process of being lowered.

The birdhouse assembly of the present invention has been found to be attractive to purple martins while providing a design offering many conveniences to the homeowner. It will be apparent to those skilled in this art that various changes and modifications may be made in construction and arrangement of the components within the sphere and scope of the invention. It is intended that such changes and modifications be included within the scope of the appended claims.

What is claimed is:

1. A birdhouse assembly adapted for housing purple martins, which comprises: a pole which may be mounted in the ground; a central sleeve slidably mounted on said pole; a plurality of gourds having openings for ingress and egress of the purple martins suspended from an array of tubular members disposed around the outer periphery of the assembly; a plurality of radial arms rigidly connecting said array of tubular members to said central sleeve; a winch and associated pulleys for raising and lowering said array.

2. The birdhouse assembly of claim 1, further provided with plurality of solid, pin members mounted on said pole which permit upward movement of said central sleeve and which project downwardly into position adjacent to said radial arms preventing both clockwise and counterclockwise rotation of said array.

3. The birdhouse assembly of claim 1 wherein said gourds are suspended from said radial arms.

4. The birdhouse assembly of claim 1 wherein said pulleys are provided on opposite sides of said pole and attached to opposite sides of said sleeve and are attached to said winch by means of a single rope to balance said central sleeve as said array is raised and lowered.

5. The birdhouse assembly of claim 3 wherein said tubular members are disposed in an octagonal shape.

6. A birdhouse assembly adapted for housing purple martins, which comprises: a pole which may be mounted in the ground; a central sleeve slidably mounted on said pole; a plurality of gourds having openings for ingress and egress of the purple martins suspended from an array of tubular members disposed around the outer periphery of the assembly; a plurality of radial arms rigidly connecting said array of tubular members to said central sleeve; a winch and associated pulleys for raising and lowering said array, plurality of solid, pin members mounted on said pole which permit upward movement of said central sleeve and which project downwardly into position adjacent to said radial arms preventing both clockwise and counterclockwise rotation of said array.

\* \* \* \* \*